United States Patent
Choi

(10) Patent No.: US 8,944,203 B2
(45) Date of Patent: Feb. 3, 2015

(54) DEVICE FOR PREVENTING FOREIGN SUBSTANCES FROM BEING INSERTED INTO LOWER PART OF FOOT PEDAL UNIT OF VEHICLE

(76) Inventor: Jung Kyoung Choi, Incheon (KR)

( * ) Notice: Subject to any disclaimer, the term of this patent is extended or adjusted under 35 U.S.C. 154(b) by 0 days.

(21) Appl. No.: 14/128,942

(22) PCT Filed: Jun. 22, 2012

(86) PCT No.: PCT/KR2012/004931
§ 371 (c)(1),
(2), (4) Date: Dec. 23, 2013

(87) PCT Pub. No.: WO2012/177070
PCT Pub. Date: Dec. 27, 2012

(65) Prior Publication Data
US 2014/0145462 A1    May 29, 2014

(30) Foreign Application Priority Data

Jun. 24, 2011 (KR) .......................... 10-2011-0061546
Apr. 30, 2012 (KR) .......................... 10-2012-0045589

(51) Int. Cl.
| | |
|---|---|
| B60T 7/06 | (2006.01) |
| G05G 1/483 | (2008.04) |
| G05G 1/30 | (2008.04) |
| B60K 26/02 | (2006.01) |
| B60K 23/02 | (2006.01) |

(52) U.S. Cl.
CPC . *G05G 1/483* (2013.01); *B60T 7/06* (2013.01); *G05G 1/30* (2013.01); *B60K 26/02* (2013.01); *B60K 23/02* (2013.01)
USPC ............................................ 180/90.6; 74/512

(58) Field of Classification Search
CPC ............ B60T 7/00; B60T 7/04; B60T 7/06; B60R 21/00; G05G 1/483; G05G 1/30; B60K 26/02; B60K 23/03
USPC ..................... 180/90.6; 74/512, 513
See application file for complete search history.

(56) References Cited

U.S. PATENT DOCUMENTS 2,823,557 A * 2/1958 Lenning .......................... 74/512

FOREIGN PATENT DOCUMENTS

| JP | 2004-175240 | 6/2004 |
|---|---|---|
| KR | 20-0237988 | 9/2001 |

(Continued)

OTHER PUBLICATIONS

PCT Written Opinion for International Application No. PCT/KR2012/004931, dated Dec. 10, 2012.

(Continued)

*Primary Examiner* — Drew Brown
(74) *Attorney, Agent, or Firm* — Kile Park Reed & Houtteman PLLC

(57) ABSTRACT

The present invention relates to a device for preventing an external substances from being inserted into the lower part of a foot pedal unit of a vehicle, and the device prevents external foreign substances from being inserted into the lower part of a vehicular foot pedal unit which includes a pedal arm and a pedal combined with an edge of said pedal arm, wherein the invention comprises a body which: is formed as a clastic member that is clastically transformed; is disposed between a lower side of said foot pedal unit and an indoor bottom surface of the vehicle; and is combined with said foot pedal unit and/or said indoor bottom surface of the vehicle, wherein said body is formed to prevent external foreign substance from being introduced to the lower side of said pedal arm and said pedal. According to the present invention, no external substances are introduced to a lower gap between the pedal arm and the pedal when the vehicle is running, thereby is preventing fatal traffic accidents.

16 Claims, 10 Drawing Sheets

(56) References Cited

FOREIGN PATENT DOCUMENTS

| | | |
|---|---|---|
| KR | 10-2007-0067658 | 6/2007 |
| KR | 10-2010-0088745 | 8/2010 |

OTHER PUBLICATIONS

PCT International Search Report of International Application No. PCT/KR2012/004931, dated Dec. 10, 2012.

\* cited by examiner

DEVICE FOR PREVENTING FOREIGN SUBSTANCES FROM BEING INSERTED INTO LOWER PART OF FOOT PEDAL UNIT OF VEHICLE

TECHNICAL FIELD

The present invention relates to a device for preventing an external object from entering a space under a foot pedal unit of a vehicle, and more particularly, to a device for preventing an external object from entering a space under a foot pedal unit of a vehicle, which prevents an external object from entering a clearance space under a pedal arm and a pedal when the vehicle is running, thereby preventing fatal traffic accidents.

BACKGROUND ART

FIG. 1 illustrates an example of a foot pedal unit 1 of a general vehicle. In some cases, an external object E such as a solid and bulky thing, for example, a can, a drinking container, a water bottle, etc. or a floor mat used in a vehicle may freely move while the vehicle is running and during an acceleration motion, sudden stop, veering, etc., may enter a clearance space 6 provided for an operation of the foot pedal unit 1 including a clutch, a brake, and an accelerator, that is, a space formed between a lower surface 4 of the foot pedal unit 1 and an indoor floor surface 5 of the vehicle.

According to research reports of the National Police Agency and the Road Traffic Safety Authority, in a physical situation such as an acceleration, sudden stop, veering, etc. when a vehicle is running, an external object such as a solid and bulky thing, for example, a can, a drinking container, a water bottle, etc., having a rod or cylindrical shape, or a floor mat used in a vehicle may enter a gap formed between the foot pedal unit, particularly a lower part of the brake, and an upper surface of the floor surface of a vehicle. In this case, even when a driver pushes the brake, the vehicle does not stop as intended so that uncontrollable and severe accidents may often occur. Regarding the clutch and accelerator, when a driver tries to push the clutch or accelerator to change the speed of a vehicle or accelerate to pass other vehicles on a highway or motorway, if an external object enters a space under a pedal, the intended acceleration is not obtained and the vehicle may be hit by a vehicle behind.

A vehicle may perform a sudden start, sudden stop, sudden veering, ascending, descending, etc. according to road conditions or unexpected situations. In this state, when an external object used or provided in a vehicle enters a clearance space provided for the operation of a foot pedal unit and then a driver, who is not aware of this situation, pushes a pedal to accelerate or stop the vehicle according to a driving situation, the pedal does not work, and thus, the vehicle enters an uncontrollable state and a rear-end collision or other collisions may occur.

Recently, foot pedal unit accidents due to the insertion of an external object have been reported by many broadcasting companies in prime time news.

As an example of a conventional technology, Korean Patent Publication No. 2007-0067658 (2007.6.28) discloses an object prevention device main body 60 that is provided at a lower side of a pedal 3. However, an external object may enter a space under a pedal arm 2 by passing around the rear side of the object prevention device main body 60, and thus, the object is trapped by the object prevention device main body 60, which may be more dangerous than a case when no object prevention device main body 60 is used. Thus, since accidents may be insufficiently prevented and installation of products is not easy, the conventional technology is not widely employed, although it is one of the necessary safety devices for a driver.

DETAILED DESCRIPTION OF THE INVENTION

Technical Problem

The present invention provides a device for preventing an external object from entering a space under a foot pedal unit of a vehicle, the device having an improved structure to prevent the external object from entering a clearance space under a pedal arm and a pedal when the vehicle is running, thereby preventing traffic accidents.

Technical Solution

According to an aspect of the present invention, there is provided a device for preventing an external object from entering a space under a foot pedal unit of a vehicle, the foot pedal unit comprising a pedal arm and a pedal coupled to an end portion of the pedal arm, the device including a main body formed of an elastic member that is elastically deformable, arranged between a lower surface of the foot pedal unit and an indoor floor surface of the vehicle, and coupled to at least one of the foot pedal unit and the indoor floor surface, in which the main body is formed to prevent the external object from entering a space under the pedal arm and the pedal.

The main body may be coupled to the indoor floor surface of the vehicle.

The main body may be formed of at least one elastic member selected from a group consisting of synthetic resin, synthetic rubber, silicon, foamed resin, and urethane.

The elastic member may be waterproof coated.

A groove portion into which the pedal arm is inserted may be formed in an upper surface of the main body.

The main body may include a surface member that is a pipe member having a hole therein and a predetermined sectional shape extending along a center axis, and an internal member arranged in the hole of the surface member and maintaining the sectional shape of the surface member.

The surface member and the internal member may be integrally formed.

The internal member may have a net-type section extending along the center axis C of the surface member, in which a plurality of through-holes having one of a variety of shapes including a diamond shape, a polygonal shape, a circular shape, and an oval shape are continuously arrayed.

The internal member may include a reinforcement plate that is a plate member extending to a rear side from a front surface portion of the surface member that comes in contact with a foot of a driver.

The reinforcement plate may be formed only in a portion of a front end portion on an imaginary line that horizontally connects the front surface portion of the surface member to a rear surface portion of the surface member.

The main body may include a side plate that closes the hole of the surface member.

The surface member may include a pedal arm corresponding unit formed to correspond to a shape of a lower surface of the pedal arm, and a pedal corresponding unit formed to correspond to a shape of a lower surface of the pedal.

The main body may include an abrasion prevention unit that is arranged in a portion that comes in contact with a foot of a driver.

The main body may be a wall structure surrounding a space formed between a lower surface of the foot pedal unit and the indoor floor surface of the vehicle.

The main body may include a pair of side wall members arranged to be separated from each other, and a front wall member closing a front end portion of the pair of side wall members.

The front wall member may be a folded wall member having a plurality of folds that are extendable and compressible in a vertical direction.

Advantageous Effects

According to the present invention, the device for preventing an external object from entering a space under a foot pedal unit of a vehicle includes a main body formed of an elastic member that is elastically deformable and arranged between a lower surface of the foot pedal unit and an indoor floor surface of the vehicle. Accordingly, the external object does not enter a clearance space under a pedal arm and a pedal during running of a vehicle, and thus, traffic accidents may be prevented.

BEST MODE

Hereinafter, the present invention will be described in detail by explaining preferred embodiments of the invention with reference to the attached drawings.

Figure 2:
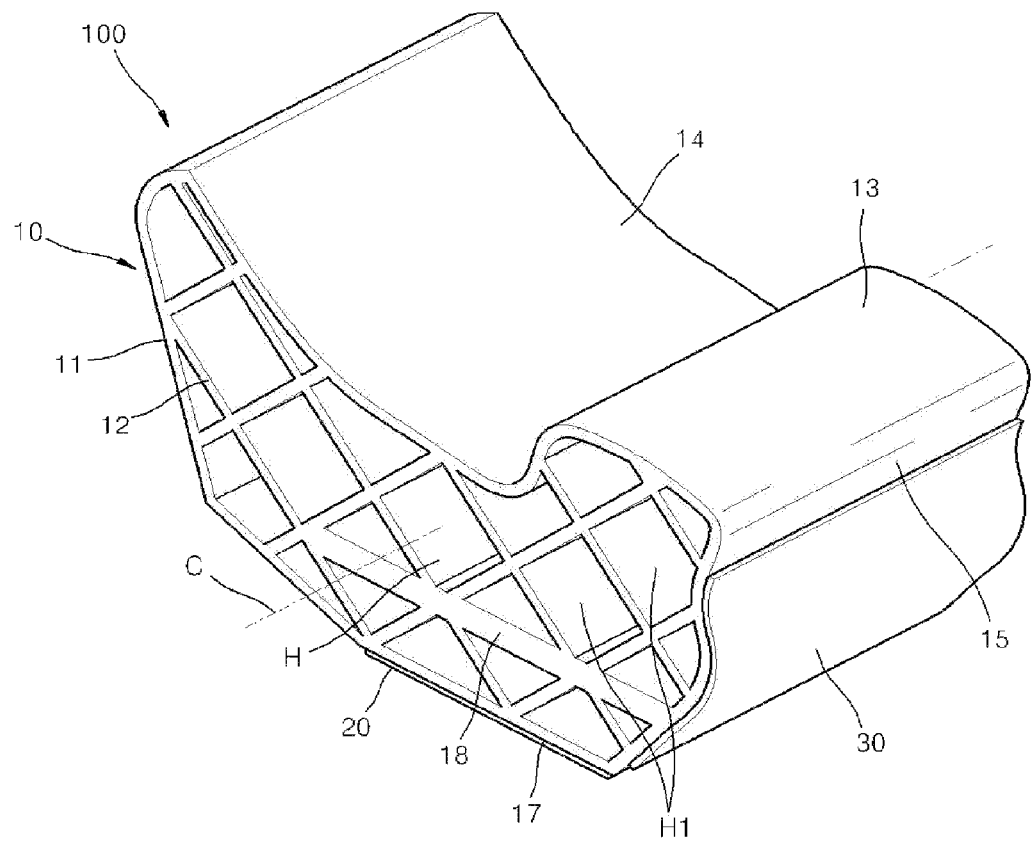
FIG. 2 is a perspective view of a device for preventing an external object from entering a space under a foot pedal unit of a vehicle, according to an embodiment of the present invention.
Figure 3:
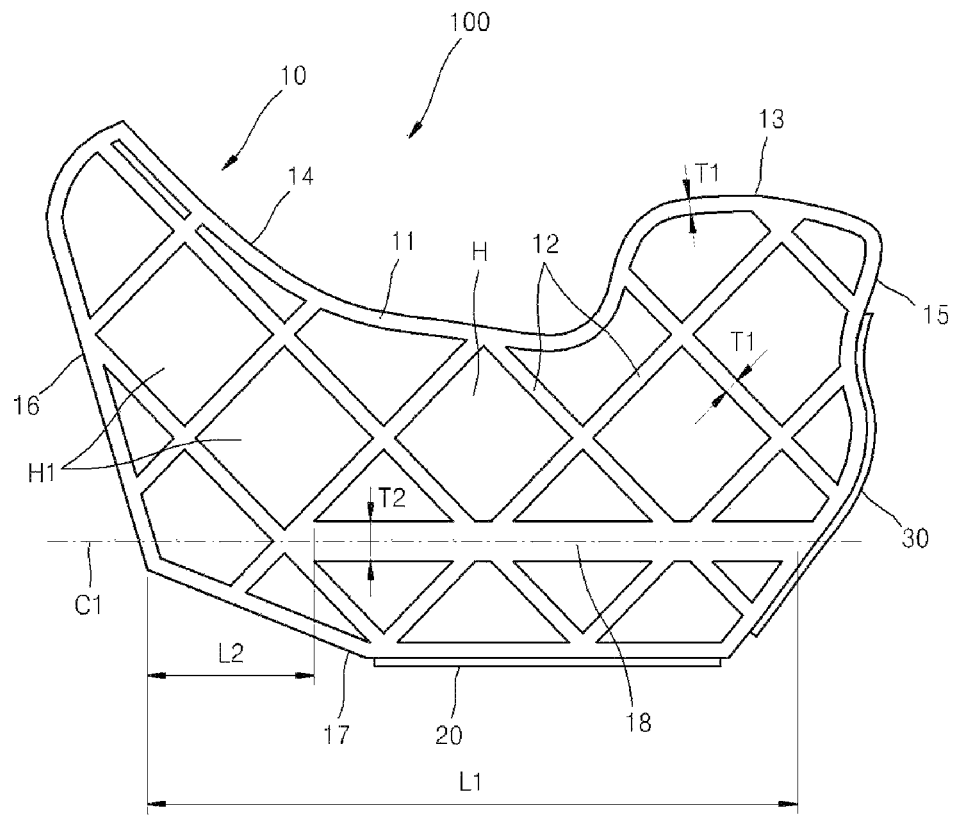
FIG. 3 is a side view of the device for preventing an external object from entering a space under a foot pedal unit of a vehicle of FIG. 2.
Figure 4:
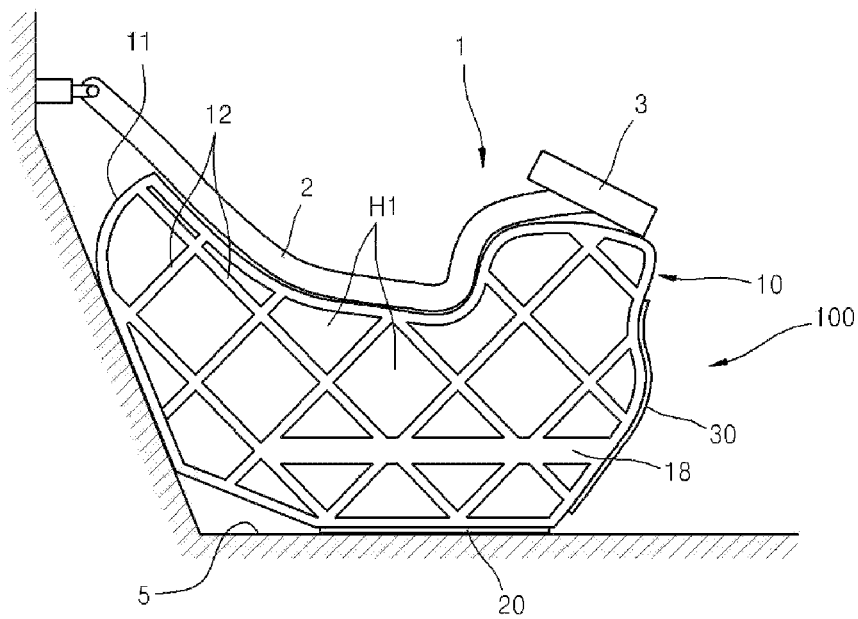
FIG. 4 illustrates a state in which the device for preventing an external object from entering a space under a foot pedal unit of a vehicle of FIG. 2 is installed at a foot pedal unit of a vehicle.

FIG. 2 is a perspective view of a device for preventing an external object from entering a space under a foot pedal unit of a vehicle, according to an embodiment of the present invention. FIG. 3 is a side view of the device for preventing an external object from entering a space under a foot pedal unit of a vehicle of FIG. 2. FIG. 4 illustrates a state in which the device for preventing an external object from entering a space under a foot pedal unit of a vehicle of FIG. 2 is installed at a foot pedal unit of a vehicle.

Figure 1:
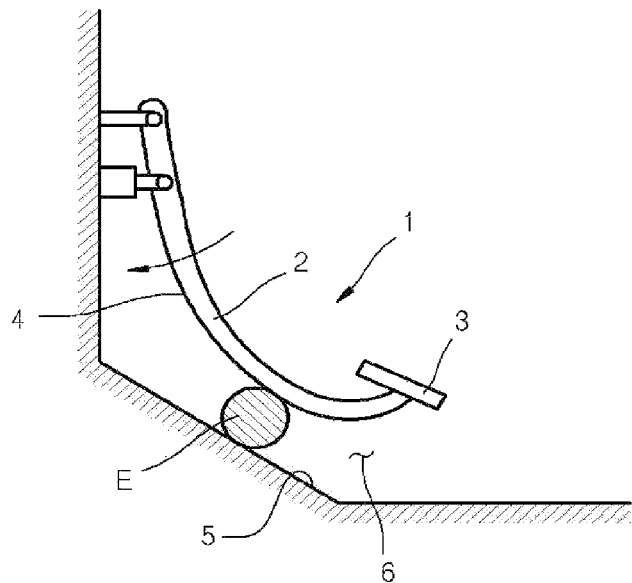
FIG. 1 illustrates an example of a conventional vehicle foot pedal unit.

Referring to FIGS. 2 to 4, a device 100 for preventing an external object from entering a space under a foot pedal unit of a vehicle according to the present embodiment prevents an external object E from entering a space under the foot pedal unit 1 of a vehicle, as illustrated in FIG. 1, and includes a main body 10, a coupling member 20, and an abrasion prevention member 30. The foot pedal unit 1 includes the pedal arm 2 that is rotatably provided and the pedal 3 that is coupled to an end portion of the pedal arm 2.

The main body 10 is formed of an elastic member that is elastically deformable, is arranged between the lower surface 4 of the foot pedal unit 1 and the indoor floor surface 5 of the vehicle, and includes a surface member 11 and an internal member 12.

The main body 10 may be formed of at least one elastic member selected from a group consisting of synthetic resin, synthetic rubber, silicon, foamed resin, and urethane. In the present embodiment, the main body 10 is manufactured of polyurethane foamed resin that is waterproof-coated after foaming processing.

Accordingly, the main body 10 exhibits a superior compression rate such that, when an uncompressed size is 100%, the main body 10 may be easily compressed by a compression force to a size of about 10-20% of the original size, and a superior self-restoration feature when a compression force is removed.

The surface member 11 has a predetermined sectional shape extending along a center axis C, is a pipe member having a hole H therein, and includes a pedal corresponding unit 13 and a pedal arm corresponding unit 14. The pedal arm corresponding unit 14 has a concave shape in a rear upper surface of the main body 10 to correspond to the shape of the lower surface 4 of the pedal arm 2. The pedal corresponding unit 13 has a convex shape in a front upper surface of the main body 10 to correspond to the shape of a lower surface of the pedal 3.

The internal member 12 is arranged in the hole H of the surface member 11 to maintain a sectional shape of the surface member 11. The internal member 12 has a net-type section extending along the center axis C of the surface member 11 in which a plurality of through-holes H1 having a variety of shapes including a diamond shape, a polygonal shape, a circular shape, an oval shape, etc. are continuously arrayed. In the present embodiment, the internal member 12 has a net-type section in which the through-holes H1, each having a diamond shape, are continuously arrayed. In the present embodiment, the surface member 11 and the internal member 12 are formed to have the same thickness T1.

A reinforcement plate 18, which is a plate member horizontally extending to a rear side from a front surface portion 15 of the surface member 11 that comes in contact with a foot of a driver, is inserted in a front lower portion of the internal member 12. Since the reinforcement plate 18 is formed only in a portion (L1-L2) of a front end portion on an imaginary line C1 horizontally connecting the front surface portion 15 of the surface member 11 and a rear surface portion 16 of the surface member 11, the reinforcement plate 18 is not inserted in a portion (L2) of a rear end portion of the internal member 12.

In the present embodiment, as illustrated in FIG. 3, since a thickness T2 of the reinforcement plate 18 is larger than a thickness T1 of the surface member 11 and the internal member 12, a counterforce of the reinforcement plate 18 in response to an axial force and a bending force is greater than that of the surface member 11 and the internal member 12.

In the present embodiment, the internal member 12 is integrally formed with the surface member 11, which may be mass-produced by manufacturing a cutting mold corresponding to the sectional shape of the main body 10 and performing a punching process using the cutting mold.

The coupling member 20 is used to couple a lower surface portion 17 of the surface member 11 and the indoor floor surface 5 of the vehicle. In the present embodiment, a double-sided tape having an adhesive force on opposite surfaces thereof is used as the coupling member 20.

The abrasion prevention member 30 is arranged at a portion that may come in contact with the foot of a driver. In the present embodiment, a pad formed of a nonwoven fabric that exhibits superior durability and may be easily folded is used as the abrasion prevention member 30. The abrasion prevention member 30 is attached on the front surface portion 15 of the surface member 11.

The device 100 configured as above is formed of an elastic member that is elastically deformable and is arranged between the lower surface 4 of the foot pedal unit 1 and the indoor floor surface 5 of the vehicle. Since the device 100 includes at least one of the lower surface 4 of the foot pedal unit 1 and the indoor floor surface 5 of the vehicle, the external object E does not enter the clearance space 6 under the pedal arm 2 and the pedal 3 while the vehicle is running so that traffic accidents may be prevented.

Also, since the device 100 prevents the external object E from entering the clearance space 6 under the pedal arm 2 and the pedal 3 while the vehicle is running, a traffic accident that may occur when the vehicle is not able to stop when stopping of the vehicle is required and a traffic accident that may occur when the vehicle is hit by another vehicle running behind because the vehicle is not able to accelerate when accelerating of the vehicle is required may be prevented. Also, installation of the device 100 may provide a driver with a sense of safety.

In addition, since the device 100 is installed in the clearance space 6 between the lower surface 4 of the foot pedal unit 1 and the indoor floor surface 5 of the vehicle, dust coming from the outside does not accumulate in the clearance space 6, thereby not contaminating the inside of the vehicle. Accordingly, cleaning the vehicle including the inside thereof becomes easy, and thus, a comfortable driving environment may be provided to a driver.

Since the lower surface portion 17 of the main body 10 of the device 100 is coupled to the indoor floor surface 5 of the vehicle, the main body 10 does not escape from the clearance space 6 under the pedal arm 2 and the pedal 3 while the vehicle is running.

Figure 5:
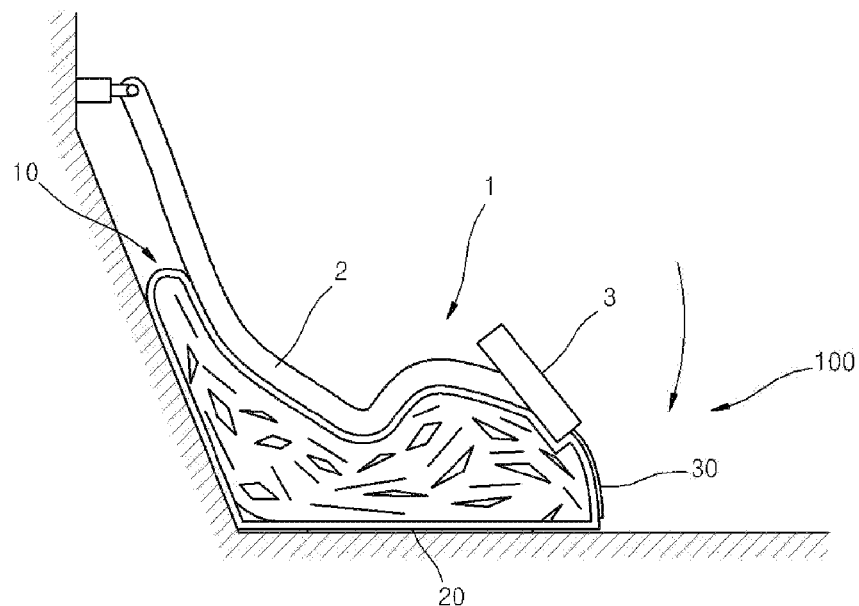
FIG. 5 illustrates a state in which a pedal is pressed and a pedal arm is rotated when the device for preventing an external object from entering a space under a foot pedal unit of a vehicle of FIG. 2 is installed at the foot pedal unit of a vehicle.

Since the main body 10 of the device 100 is formed of at least one elastic member selected from a group consisting of synthetic resin, synthetic rubber, silicon, foamed resin, and urethane, the main body 10 exhibits a superior compression rate when the pedal 3 is pressed by the driver as illustrated in FIG. 5, and a superior self-restoration feature to restore the original shape of the main body 10 when the pedal 3 is not pressed as illustrated in FIG. 4.

Since the elastic member of the main body 10 of the device 100 is waterproof-coated, deterioration of the self-restoration feature and durability due to intrusion of moisture from the outside may be prevented.

In addition, since the main body 10 of the device 100 includes the surface member 11 having a predetermined sectional shape extending along the center axis C and being a pipe member having the hole H therein and the internal member 12 arranged in the hole H of the surface member 11 and maintaining the sectional shape of the surface member 11, the device 100 may easily maintain the original shape even when inserted into the clearance space 6 and exhibits a superior self-restoration feature.

Since the surface member 11 and the internal member 12 of the main body 10 of the device 100 are integrally formed together, a coupling process or an adhesion process between the surface member 11 and the internal member 12 is unnecessary, and thus, a manufacturing process may be simplified and the total manufacturing cost may be reduced.

Also, since the internal member 12 of the device 100 is formed as a net-type section, in which the through-holes H1 having a variety of shapes including a diamond shape, a polygonal shape, a circular shape, an oval shape, etc. are continuously arrayed and extend along the center axis C of the surface member 11, the compression rate and self-restoration feature of the internal member 12 may be improved, the material costs of the internal member 12 may be reduced, and a sense of decoration may be improved, compared to a case when no through-holes H1 are formed.

In addition, since the internal member 12 of the device 100 includes the reinforcement plate 18, which is a plate member extending to the rear side from the front surface portion 15 of the surface member 11 that comes in contact with the foot of a driver, even when a horizontal compression force is applied to the main body 10 by the foot of a driver, the main body 10 may easily maintain the original shape.

Since the reinforcement plate 18 is formed only in the portion (L1-L2) in the front end portion of the imaginary line C1 horizontally connecting the front surface portion 15 of the surface member 11 and the rear surface portion 16 of the surface member 11, the device 100 may be easily installed in the foot pedal unit 1 having a different length or shape according to the type of a vehicle. In other words, a space, as long as the length L2 along which the reinforcement plate 18 is not inserted, exists for the length of the foot pedal unit 1 in an area where the device 10 may be installed.

Also, since the surface member 11 includes the pedal arm corresponding unit 13 formed to corresponding to the shape of the lower surface 4 of the pedal arm 2 and the pedal corresponding unit 14 formed to correspond to the shape of the lower surface of the pedal 3, the device 10 may be installed by being easily inserted into a space under the lower surface 4 of the foot pedal unit 1.

Since the main body 10 includes the abrasion prevention member 30 that is arranged in a portion that may come in contact with the foot of a driver, the outer circumferential surface of the surface member 11 of the device 100 may be prevented from being damaged or abraded due to repeated contacts with the foot of a driver.

Figure 6:
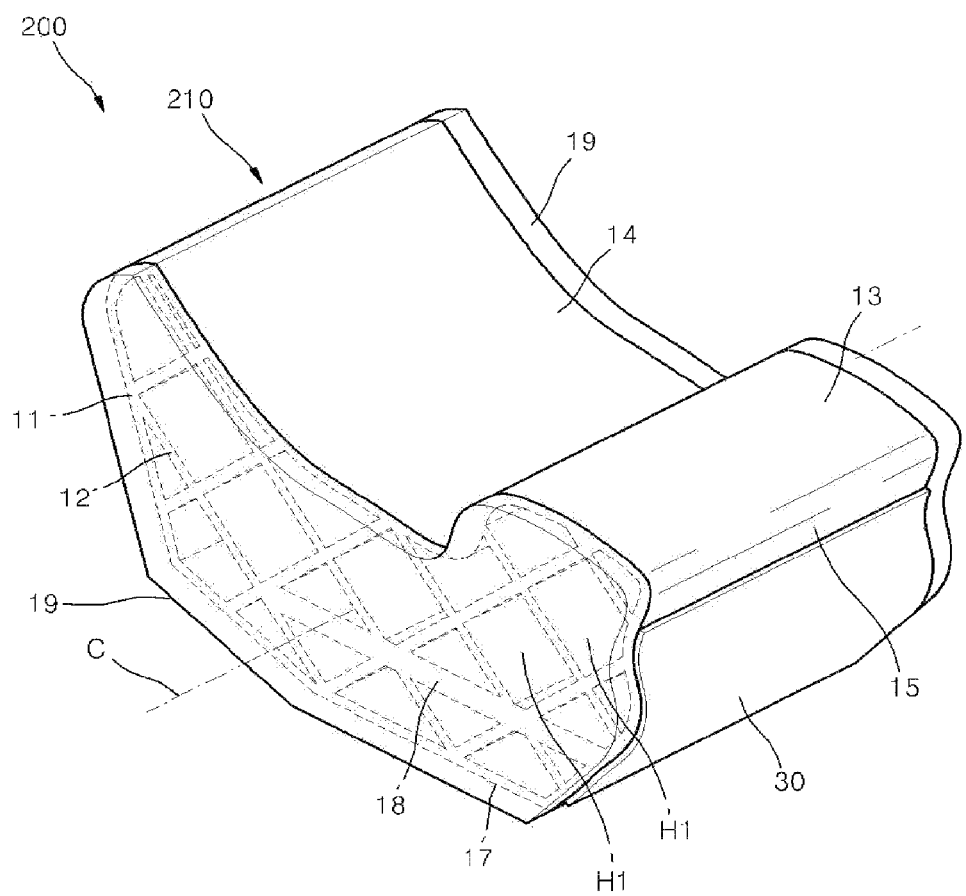
FIG. 6 is a perspective view of a device for preventing an external object from entering a space under a foot pedal unit of a vehicle, according to another embodiment of the present invention.

FIG. 6 is a perspective view of a device 200 for preventing an external object from entering a space under a foot pedal unit of a vehicle, according to another embodiment of the present invention. Since the structure and effect of the device 200 according to the present embodiment are almost the same as those of the device 100 according to the above-described embodiment, the detailed descriptions of the device 200 will be omitted herein and only differences between the device 200 and the device 100 will be discussed below.

The device 200 includes a main body 210 having a pair of side plates 19 closing the hole H of the surface member 11, instead of the main body 10. The side plates 19 is a member formed of the same material as that of the surface member 11. Accordingly, the device 200 may prevent intrusion of a relatively small object E or moisture through the through-holes H1 of the internal member 12.

Figure 7:
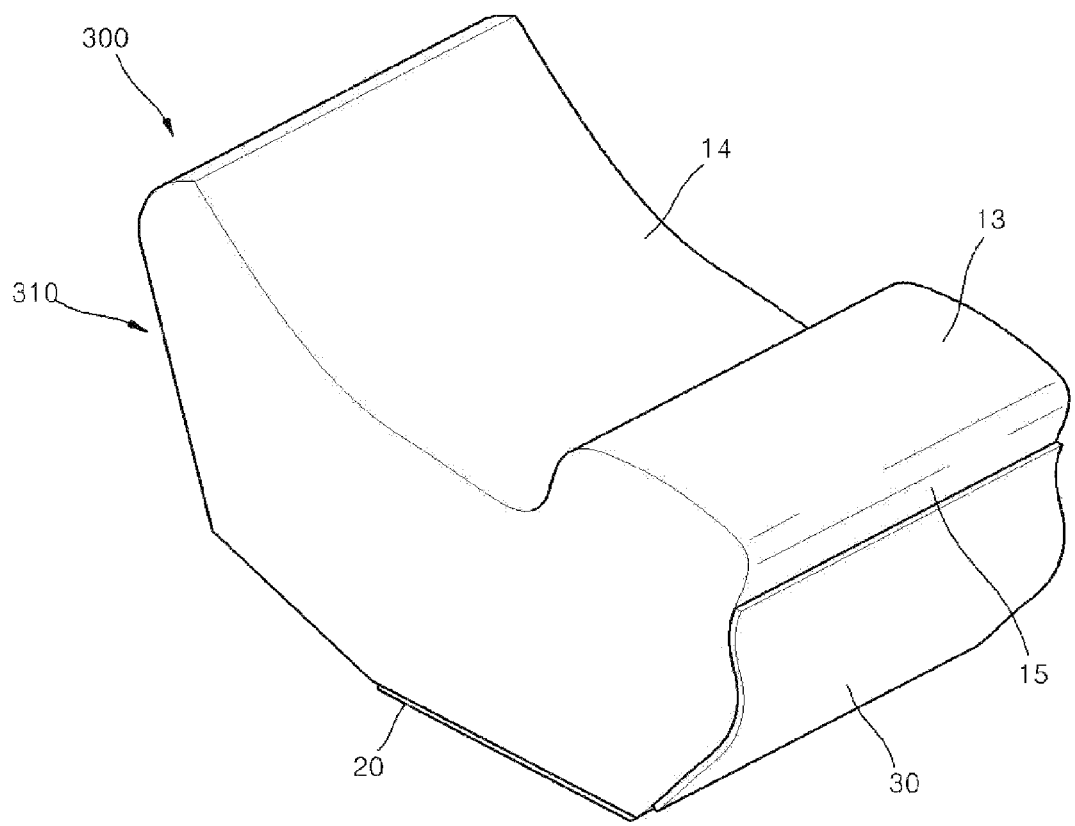
FIG. 7 is a perspective view of a device for preventing an external object from entering a space under a foot pedal unit of a vehicle, according to another embodiment of the present invention.

FIG. 7 is a perspective view of a device 300 for preventing an external object from entering a space under a foot pedal unit of a vehicle, according to another embodiment of the present invention. Since the structure and effect of the device 300 according to the present embodiment are almost the same as those of the device 100 according to the above-described embodiment, the detailed descriptions of the device 300 will be omitted herein and only differences between the device 300 and the device 100 will be discussed below.

The device 300 includes a main body 310 that is manufactured as a single mass without additional spaces therein, instead of the surface member 11 and the internal member 12. The main body 310 is manufactured of a polyurethane (PU) foamed resin that is waterproof-coated after foaming processing, like the main body 10. However, considering a compression rate, a foaming rate is increased to be higher than that of the main body 10 so that a foamed resin having a relatively large amount of air bubbles may be used.

Since the device 300 includes the main body 310 that is manufactured as a single mass, a cutting mold having a complicated structure to form the through-holes H1 does not need to be manufactured, and thus the overall manufacturing costs may be reduced.

In the present embodiment, although the inside of the main body 310 is completely filled without any additional space, the main body 310 may have a structure in which a concave space portion (not shown) is inwardly recessed from a rear surface or a lower surface of the main body 310.

Figure 8:
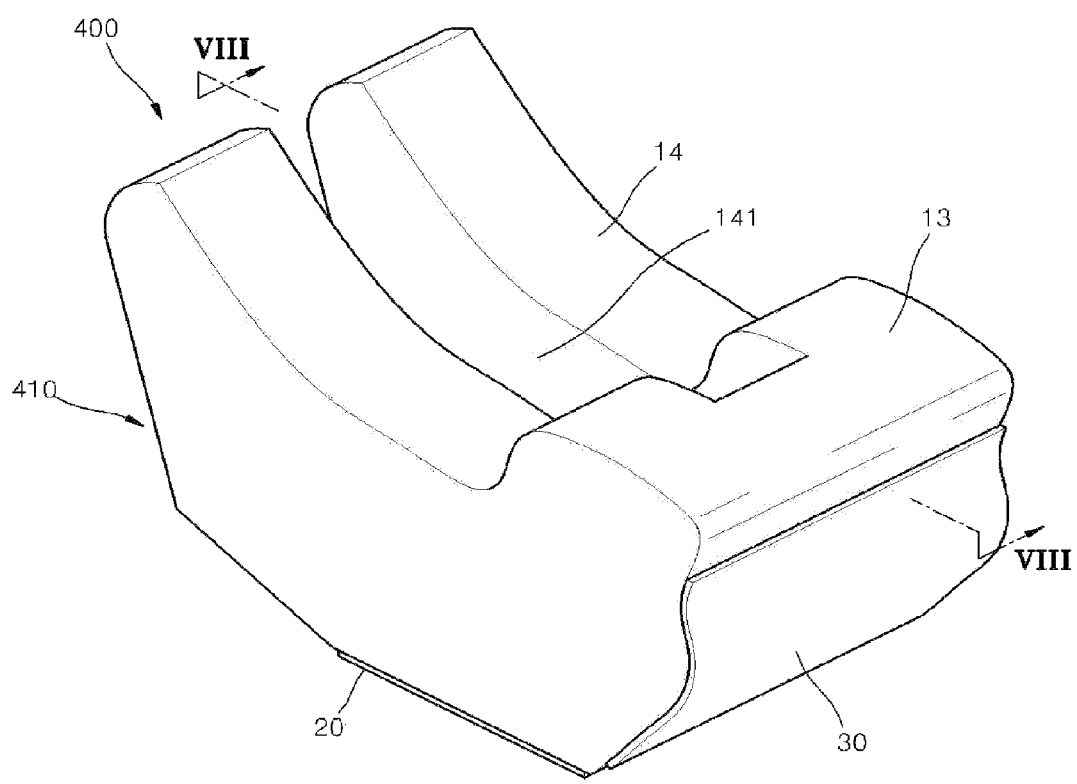
FIG. 8 is a perspective view of a device for preventing an external object from entering a space under a foot pedal unit of a vehicle, according to another embodiment of the present invention.

FIG. 8 is a perspective view of a device 400 for preventing an external object from entering a space under a foot pedal unit of a vehicle, according to another embodiment of the present invention. Since the structure and effect of the device 400 according to the present embodiment are almost the same as those of the device 300 according to the above-described embodiment, the detailed descriptions of the device 400 will be omitted herein and only differences between the device 400 and the device 300 will be discussed below.

The device 400 includes a main body 410 having a groove portion 141 formed in an upper surface thereof and in which the pedal arm 2 may be inserted.

Figure 9:
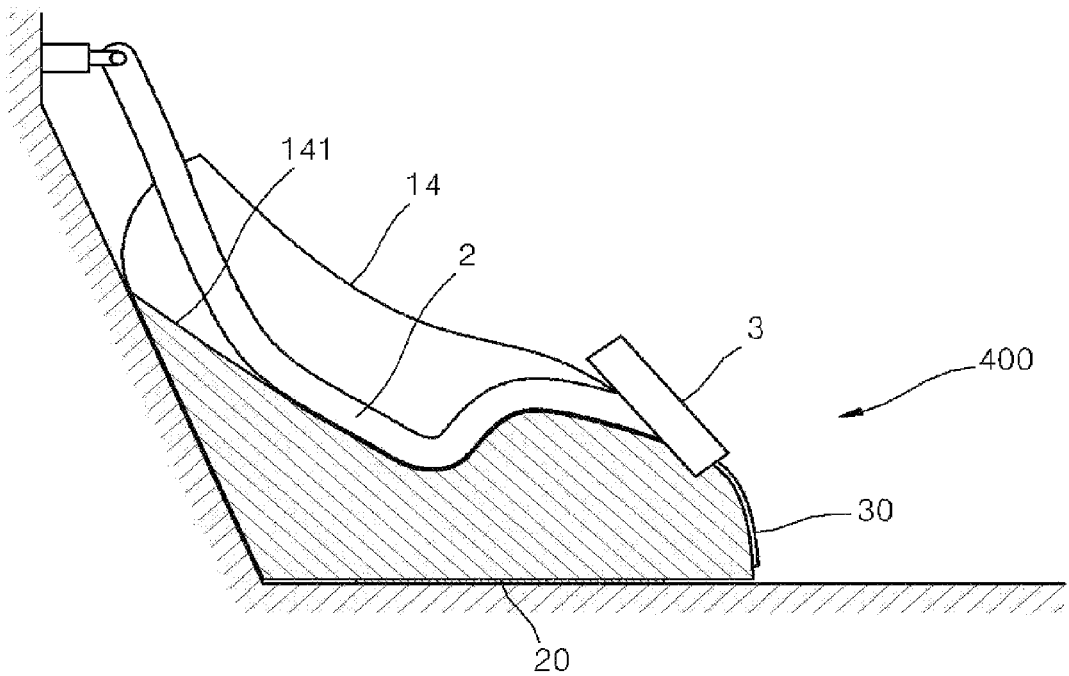
FIG. 9 is a cross-sectional view taken along line VIII-VIII of FIG. 8, illustrating a state in which a pedal is pressed and thus a pedal arm is rotated when the device is installed on the foot pedal unit.

Accordingly, with regard to the device 400, when a driver presses the pedal 3 as illustrated in FIG. 9, a front end portion of the main body 410 disposed under the pedal 3 is compressed relatively much and a rear end portion of the main body 410 disposed under the pedal arm 2 is not compressed or is compressed relatively less. Compared to a case when no groove portion 141 is formed, a resistance force felt by the driver when pressing the pedal 3 is reduced.

Figure 10:
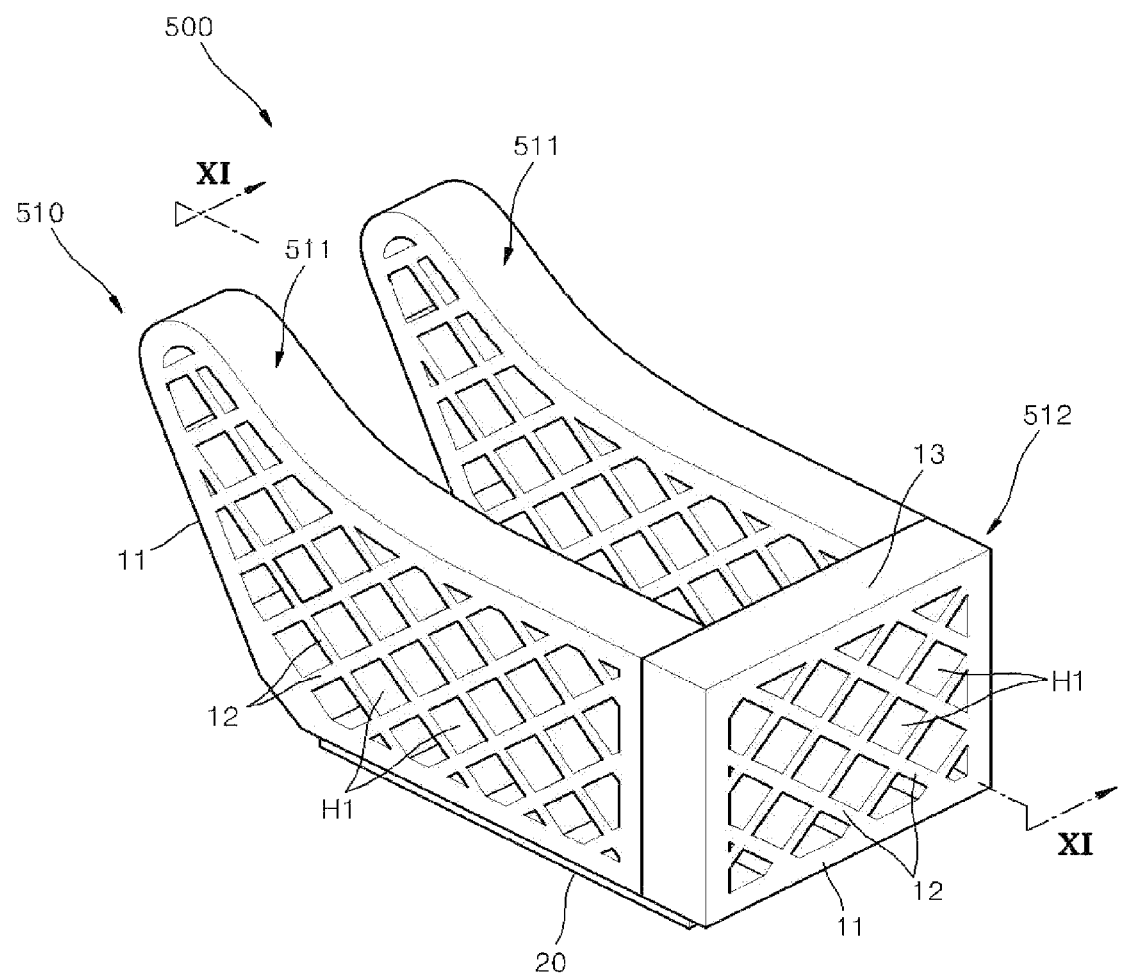
FIG. 10 is a perspective view of a device for preventing an external object from entering a space under a foot pedal unit of a vehicle, according to another embodiment of the present invention.
Figure 11:
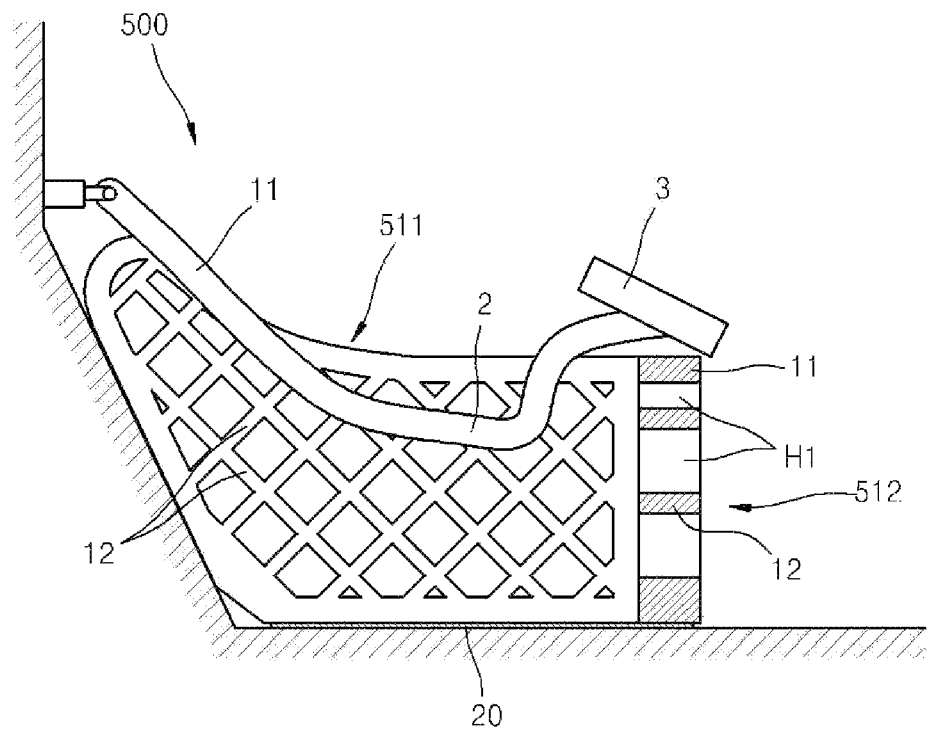
FIG. 11 is a cross-sectional view taken along line XI-XI of FIG. 10, illustrating a state in which the device is installed on the foot pedal unit.

FIG. 10 is a perspective view of a device 500 for preventing an external object from entering a space under a foot pedal unit of a vehicle, according to another embodiment of the present invention. Since the structure and effect of the device 500 according to the present embodiment are almost the same as those of the device 100 according to the above-described embodiment, the detailed descriptions of the device 500 will be omitted herein and only differences between the device 500 and the device 100 will be discussed below.

The device 500 includes a main body 510 that is a wall structure surrounding the clearance space 6 formed between the lower surface 4 of the foot pedal unit 1 and the indoor floor surface 5 of a vehicle, instead of the main body 10.

In the present embodiment, the main body 510 includes a pair of side wall members 511 arranged at the left and right sides of the pedal arm 2 and a front wall member 512 closing a front end portion of the side wall members 511. The side wall members 511 and the front wall member 512 have the same structure and material as the main body 10 of the device 100, whereas a width of the surface member 11 of each of the side wall members 511 in the left and right directions is relatively shorter than a width of the main body of the device 100 in the left and right directions.

Since the main body 510 has a wall structure surrounding the clearance space 6 formed between the lower surface 4 of the foot pedal unit 1 and the indoor floor surface 56 of the vehicle, the device 500 is advantageous in that overall material costs are lower than those of the devices 100, 200, 300, and 400.

Since the main body 510 includes the side wall members 511 arranged to be separated from each other and the front wall member 512 closing the front end portion of the side wall members 511, the device 500 is advantageous in that the main body 510 may be mass-produced by punching a sheet of a PU foamed resin material and having a relatively small thickness.

Figure 12:
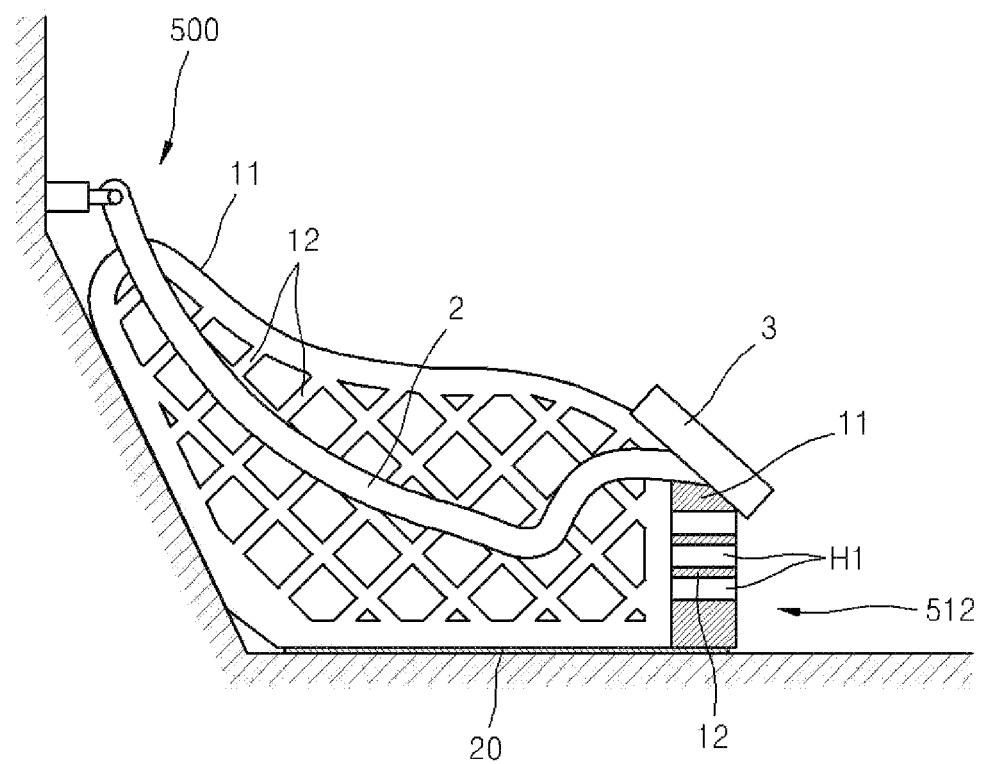
FIG. 12 illustrates a state in which, a pedal is pressed and thus a pedal arm is rotated when the device is installed on the foot pedal unit.

Also, regarding the device 500, when a driver presses the pedal 3 as illustrated in FIG. 12, the front wall member 512 disposed under the pedal 3 is compressed relatively much and the side wall members 511 disposed under the pedal arm 2 are not compressed or is compressed relatively less. Thus, a resistance force felt by the driver when pressing the pedal 3 is reduced. Also, a fatigue destruction phenomenon of the side wall members 511 is reduced so that a usage life of the device 500 is increased.

Figure 13:
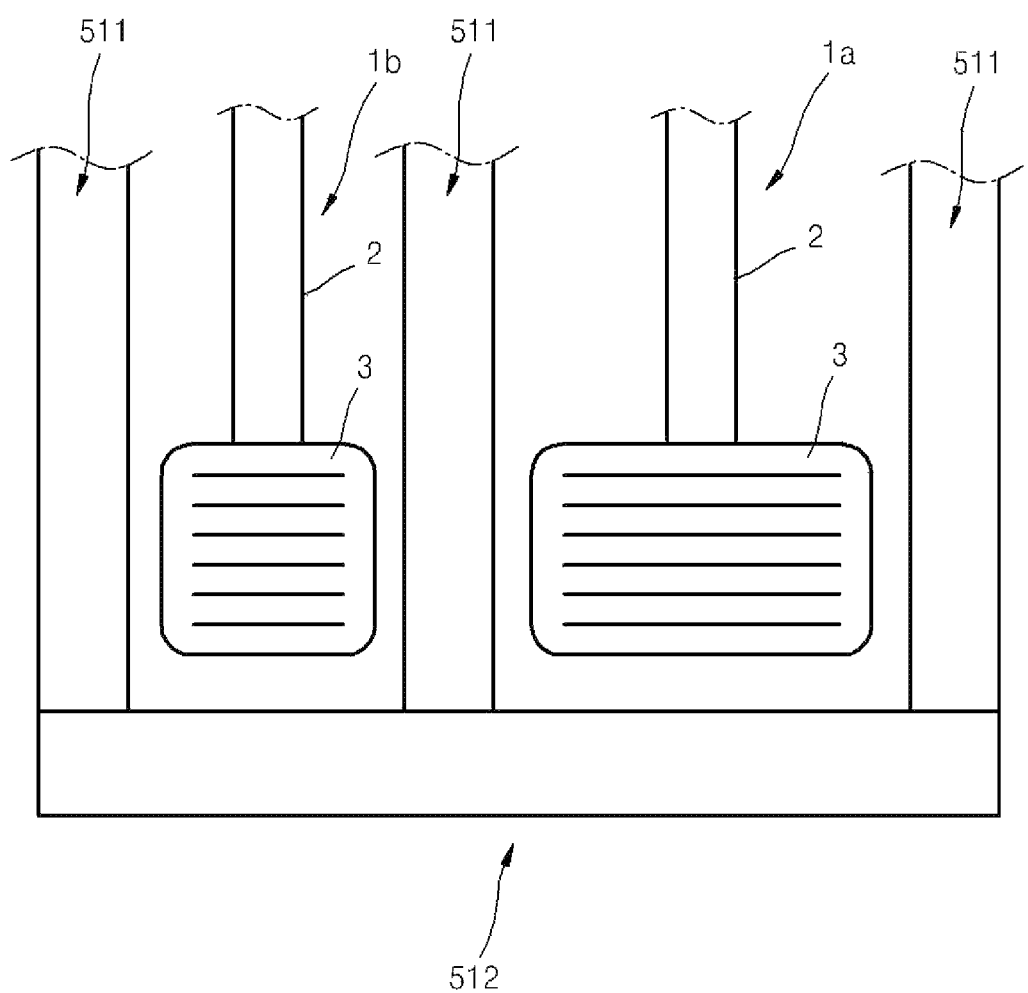
FIG. 13 illustrates an applied example of the device of FIG. 10 that is installed for both of a clutch and a brake.

FIG. 13 illustrates an application example of the device 500 of FIG. 10 that may simultaneously protect both of a foot pedal unit 1a of a brake and a foot pedal unit 1b of a clutch. The application example of the device 500 includes three side wall members 511 and one front wall member 512.

In the application example of the device 500, since the number of the side wall members 511 in use is reduced by one compared to a case of using two devices 500, the overall manufacturing costs may be reduced and the device 500 may be structurally stable.

In the present embodiment, although the main body 510 has a plane shape of a "π" shape, the plane shape of the main body 510 may be modified to have a plane shape corresponding to the plane shape of the foot pedal unit 1.

Figure 14:
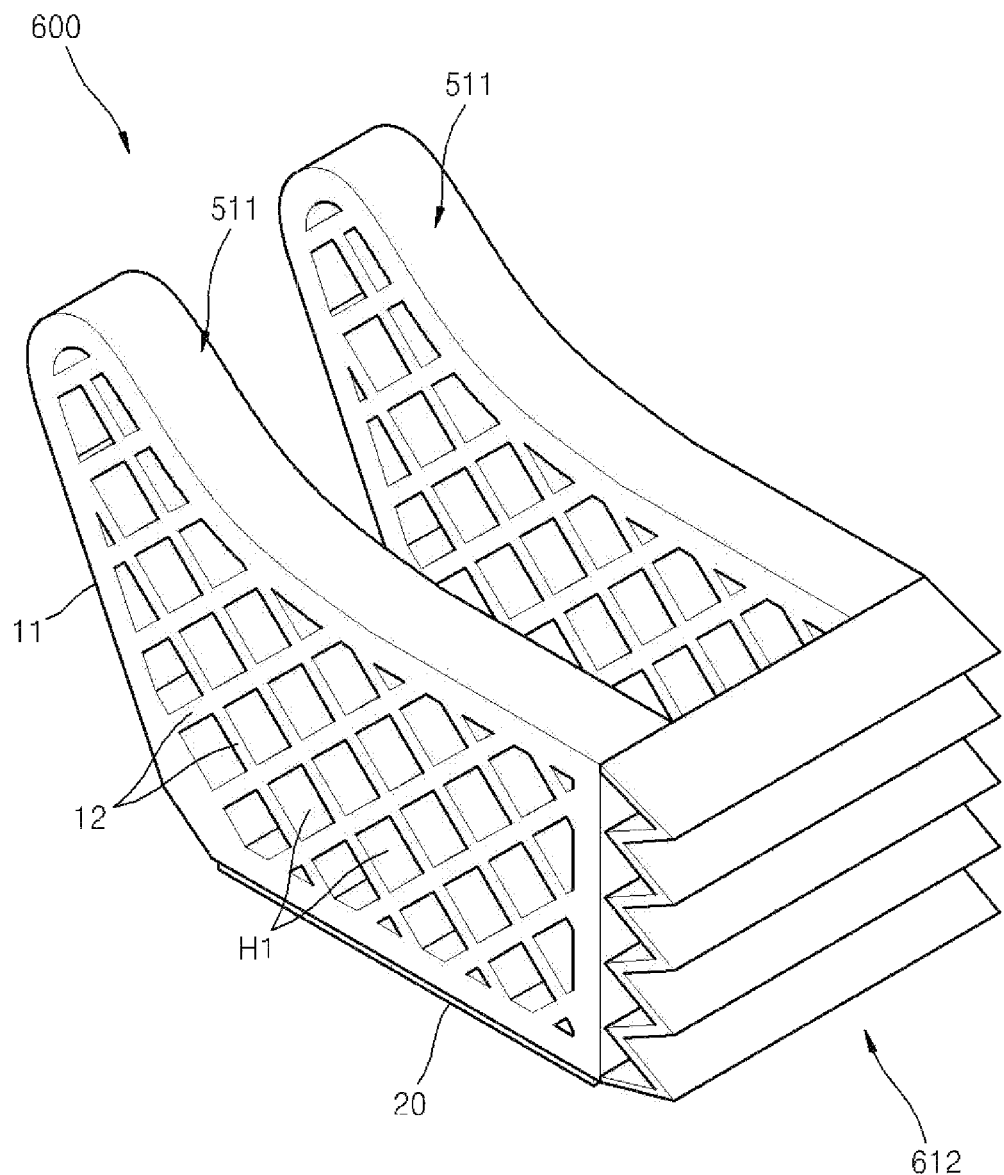
FIG. 14 is a perspective view of a device for preventing an external object from entering a space under a foot pedal unit of a vehicle, according to another embodiment of the present invention.

FIG. 14 is a perspective view of a device 600 for preventing an external object from entering a space under a foot pedal unit of a vehicle, according to another embodiment of the present invention. Since the structure and effect of the device 600 according to the present embodiment are almost the same as those of the device 500 according to the above-described embodiment, detailed descriptions of the device 600 will be omitted and only the differences between the device 600 and the device 500 will be discussed below.

The device 600 according to the present embodiment includes a front wall member 612, which is a folded wall member having a plurality of folds capable of being vertically extended or compressed, instead of the front wall member 512 where the through-holes H1, each having a diamond type, are continuously arrayed.

The front wall member 612 is a so-called zebra structure that is manufactured of a synthetic resin sheet having a small thickness. Since the front wall member 612 is a folded wall member having a plurality of folds that may be vertically extended or compressed, fatigue destruction is not generated even when repeated pressing operations of the pedal 3 occur, and thus, the device 600 has a superior compression rate when the pedal 3 is pressed.

Also, as the front wall member 612 may perform a function of the abrasion prevention member 30 of the device 100, the device 600 has the advantage of not requiring separate attaching of the abrasion prevention member 30.

Although in the above-described embodiments the main body 10 is mass-produced through a punching process using a cutting mold after manufacturing the cutting mold corresponding to the sectional shape of the main body 10 of FIG. 3, the main body 10 may be mass-produced by an extrusion molding method instead of the punching process.

Although in the above-described embodiment the main bodies 10, 210, 310, 410, and 510 are each coupled to the indoor floor surface 5 of the vehicle, the main bodies 10, 210, 310, 410, and 510 may be each coupled to the foot pedal unit 1 only or both of the indoor floor surface 5 of the vehicle and the foot pedal unit 1.

Although in the above-described embodiments a double-sided adhesive tape is used as the coupling member 20 to couple the lower surface portion 17 of the main body 10 and the indoor floor surface 5 of the vehicle with each other, other coupling methods such as screw coupling or Velcro coupling may also be used.

Although in the above-described embodiments the abrasion prevention member 30, which is a pad of an unwoven fabric material, is used as the abrasion prevention unit arranged in a portion that may come in contact with the foot of a driver, other abrasion prevention members formed of a variety of materials may also be used. Also, a foaming rate is partially reduced in a portion that may come in contact with the foot of a driver so that a hard portion may be formed.

As described above, according to one or more of the above embodiments of the present invention, the main body is formed of an elastic member that is elastically deformable and arranged between the lower surface of the foot pedal unit and the indoor floor surface of the vehicle. Thus, an external object may not be inserted in the clearance space under the pedal arm and the pedal while a vehicle is running, and thus, traffic accidents may be prevented.

While the present invention has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present invention as defined by the following claims.

The invention claimed is:

1. A device for preventing an external object from entering a space under a foot pedal unit of a vehicle, the foot pedal unit comprising a pedal arm and a pedal coupled to an end portion of the pedal arm, the device comprising:

a main body formed of an elastic member that is elastically deformable, arranged between a lower surface of the foot pedal unit and an indoor floor surface of the vehicle, and coupled to at least one of the foot pedal unit and the indoor floor surface, wherein the main body is formed to prevent the external object from entering a space under the pedal arm and the pedal, and wherein a groove portion into which the pedal arm is inserted is formed in an upper surface of the main body.

2. The device of claim 1, wherein the elastic member is waterproof coated.

3. A device for preventing an external object from entering a space under a foot pedal unit of a vehicle, the foot pedal unit comprising a pedal arm and a pedal coupled to an end portion of the pedal arm, the device comprising:

a main body formed of an elastic member that is elastically deformable, arranged between a lower surface of the foot pedal unit and an indoor floor surface of the vehicle, and coupled to at least one of the foot pedal unit and the indoor floor surface, wherein the main body is formed to prevent the external object from entering a space under the pedal arm and the pedal, and wherein the main body comprises:

a surface member that is a pipe member having a hole therein and a predetermined sectional shape extending along a center axis; and an internal member arranged in the hole of the surface member and maintaining the sectional shape of the surface member.

4. The device of claim 3, wherein the surface member and the internal member are integrally formed.

5. The device of claim 3, wherein the internal member has a net-type section extending along the center axis C of the surface member, in which a plurality of through-holes having one of a variety of shapes including a diamond shape, a polygonal shape, a circular shape, and an oval shape are continuously arrayed.

6. The device of claim 3, wherein the internal member comprises a reinforcement plate that is a plate member extending to a rear side from a front surface portion of the surface member that comes in contact with a foot of a driver.

7. The device of claim 6, wherein the reinforcement plate is formed only in a portion of a front end portion on an imaginary line that horizontally connects the front surface portion of the surface member to a rear surface portion of the surface member.

8. The device of claim 3, wherein the main body comprises a side plate that closes the hole of the surface member.

9. The device of claim 3, wherein the surface member comprises:

a pedal arm corresponding unit formed to correspond to a shape of a lower surface of the pedal arm; and a pedal corresponding unit formed to correspond to a shape of a lower surface of the pedal.

10. The device of claim 3, wherein the elastic member is waterproof coated.

11. A device for preventing an external object from entering a space under a foot pedal unit of a vehicle, the foot pedal unit comprising a pedal arm and a pedal coupled to an end portion of the pedal arm, the device comprising:

a main body formed of an elastic member that is elastically deformable, arranged between a lower surface of the foot pedal unit and an indoor floor surface of the vehicle, and coupled to at least one of the foot pedal unit and the indoor floor surface, wherein the main body is formed to prevent the external object from entering a space under the pedal arm and the pedal, and wherein the main body comprises an abrasion prevention unit that is arranged in a portion that comes in contact with a foot of a driver.

12. The device of claim 11, wherein the elastic member is waterproof coated.

13. A device for preventing an external object from entering a space under a foot pedal unit of a vehicle, the foot pedal unit comprising a pedal arm and a pedal coupled to an end portion of the pedal arm, the device comprising:

a main body formed of an elastic member that is elastically deformable, arranged between a lower surface of the foot pedal unit and an indoor floor surface of the vehicle, and coupled to at least one of the foot pedal unit and the indoor floor surface, wherein the main body is formed to prevent the external object from entering a space under the pedal arm and the pedal, and wherein the main body is a wall structure surrounding a space formed between a lower surface of the foot pedal unit and the indoor floor surface of the vehicle.

14. The device of claim 13, wherein the main body comprises:

a pair of side wall members arranged to be separated from each other; and a front wall member closing a front end portion of the pair of side wall members.

15. The device of claim 14, wherein the front wall member is a folded wall member having a plurality of folds that are extendable and compressible in a vertical direction.

16. The device of claim 13, wherein the elastic member is waterproof coated.

* * * * *